United States Patent [19]

Chiang

[11] 4,280,084
[45] Jul. 21, 1981

[54] METHOD OF AND APPARATUS FOR OPERATING STEPPING MOTORS

[76] Inventor: David Chiang, 649 Caledonia Rd., Dix Hills, N.Y. 11746

[21] Appl. No.: 82,742

[22] Filed: Oct. 9, 1979

Related U.S. Application Data

[63] Continuation-in-part of Ser. No. 872,656, Jan. 26, 1978, Pat. No. 4,215,302.

[51] Int. Cl.³ .............................................. G05B 19/40
[52] U.S. Cl. ..................................... 318/696; 318/611
[58] Field of Search ............... 318/696, 685, 611, 138, 318/254

[56] References Cited

U.S. PATENT DOCUMENTS

| | | | |
|---|---|---|---|
| 3,541,418 | 11/1970 | Agin et al. | 318/696 |
| 3,599,069 | 8/1971 | Welch | 318/690 |
| 3,812,414 | 5/1974 | Abraham | 318/696 |
| 3,896,363 | 7/1975 | Kinsel et al. | 318/696 |
| 3,947,742 | 3/1976 | Van Acker | 318/611 |
| 4,091,316 | 5/1978 | Friedman | 318/696 |
| 4,215,302 | 7/1980 | Chiang | 318/696 |

Primary Examiner—B. Dobeck
Attorney, Agent, or Firm—Hane, Roberts, Spiecens & Cohen

[57] ABSTRACT

A method and apparatus for driving a stepping motor by angularly displacing the revolvable magnetic field with respect to the rotor by a first displacement angle in a given direction of revolution and then revolving the revolvable magnetic field, preferably with linearly increasing velocity and therefore maintaining constant displacement angle between the field and the rotor until the rotor rotates at a second velocity.

17 Claims, 7 Drawing Figures

VARIABLE RELUCTANCE STEPPING MOTOR — SML

POSITION ACCUMULATOR – PAR

STEPPING MOTOR DRIVER – SMD

METHOD OF AND APPARATUS FOR OPERATING STEPPING MOTORS

CROSS-REFERENCES TO RELATED APPLICATION

This application is a continuation-in-part of my co-pending U.S. Application Ser. No. 872,656, filed Jan. 26, 1978 now U.S. Pat. No. 4,215,302.

BACKGROUND OF THE INVENTION

This invention pertains to open-loop stepping motor controllers and methods for operating stepping motors.

In my said U.S. Application Ser. No. 872,656 now U.S. Pat. No. 4,215,302 and in U.S. Pat. No. 3,947,742 there are disclosed methods and apparatus for controlling stepping motors by coupling in an underdamped manner an elastic means (stator generated magnetic field) to a driven member (rotor and load) and utilizing the natural frequency of the system including the elasticity of the elastic means and the mass of the driven member to enhance the change of the speed of the driven member.

Such a concept has created a demand for even better controlling of stepping motors.

SUMMARY OF THE INVENTION

It is accordingly a general object of the invention to provide for improved controlling of stepping motors wherein rotor positioning is faster than with the above described stepping motors.

Briefly the invention concerns a method and apparatus for driving a stepping motor having a stator means for generating a revolvable magnetic field and a rotor whose angular position is influenced by the revolvable magnetic field from a first velocity to a second velocity wherein either one of the velocities can be zero velocity. The invention contemplates driving the stepping motor by angularly displacing the revolvable magnetic field with respect to the rotor by a first displacement angle in a given direction of revolution and then revolving the revolvable magnetic field, preferably with linearly increasing velocity and therefore maintaining constant displacement angle between the field and the rotor until the rotor rotates at the second velocity. Thereafter, angularly displacing the revolvable magnetic field with respect to the rotor by a second displacement angle in a direction of revolution which is opposite to the said given direction and then revolving the revolvable magnetic field at the second velocity.

BRIEF DESCRIPTION OF THE DRAWING

Other objects, the features, and advantages of the invention will be apparent from the following detailed diagram when read with the accompanying drawing which shows presently preferred apparatus for realizing the invention.

In the drawing.

DETAILED DESCRIPTION

Figure 1:
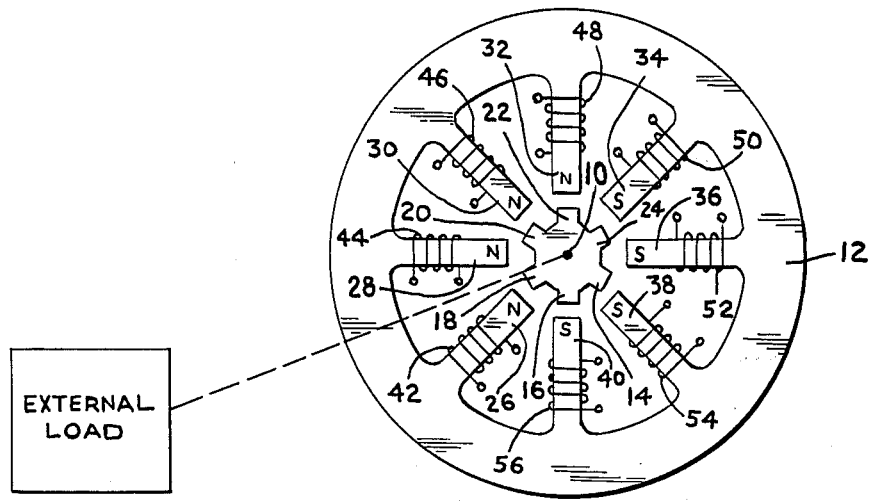
FIG. 1 schematically shows a variable reluctance (VR) type of stepping motor.

A four-phase 15°-per-step variable-reluctance motor coupled to a generalized external load is shown in FIG. 1. It is used as an example with the understanding that the following step-by-step development is applicable to stepping motors of permanent-magnet and variable-reluctance types. also, the following development is independent of the number of phases and stepping angles of the motor involved.

The illustrated motor conventionally includes a rotor 10 in operative association with a stator 12. The rotor has a plurality of teeth 14, 16, 18, 20, 22 and 24. The stator has a plurality of poles 26, 28, 30, 32, 34, 36, 38 and 40 which are divided into north and south poles. On these poles are provided respective windings 42, 44, 46, 48, 50, 52, 54 and 56. The arrangement is such that alignment is possible only between a limited number of teeth and poles at a given time. In the illustrated example, tooth 22 is aligned with pole 32 and tooth 16 is aligned with pole 40. As rotor 10 rotates, other combinations come into alignment.

Using appropriate mathematical models with respect to static torque characteristics, it can be shown that the stator torque is a function of the displacement between the electromagnetic field and the rotor when one set of windings is energized. This result is well known and has been verified for both permanent-magnet and variable-reluctance motors. A detailed analysis is given in my above-referred copending application Ser. No. 872,656.

It can also be shown by the fundamental equations of rotary motion that the acceleration on a rotor is a function of the torque, i.e., the greater the torque, the greater the acceleration. With this in mind attention is directed to FIG. 2 and 3.

Figure 2:
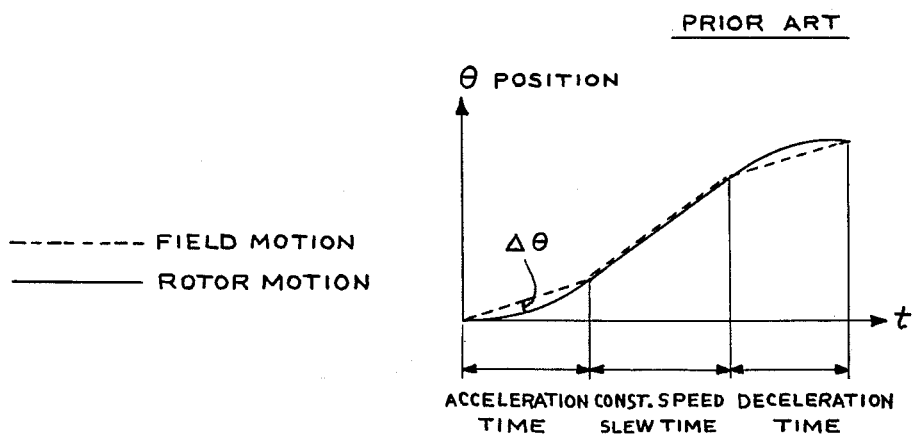
FIG. 2 shows a graph of the rotor and stator positions as a function of time for single-stage acceleration and deceleration when utilizing the above-referenced prior art teachings.

In FIG. 2 there is shown curves of angular position $\theta$ as a function of time for the stepping motors shown in the above-cited references. In the Figure, the dotted curve represents the position of the magnetic field generated by the stator and the solid line the corresponding position of the rotor. It should be recalled that the torque is a function of the displacement angle, i.e., the instantaneous $\Delta\theta$ value. It is seen during the positive acceleration time the stator is given a first constant polarity and leads the rotor thus "pulling" it to follow. During the slew (zero acceleration) time the stator field is given another constant velocity and there is just enough displacement (torque) to overcome friction. During the deceleration (negative acceleration) time the stator field is given a constant slower velocity and lags the rotor to act as a drag or braking force. The most important thing to note is that during both the positive and negative acceleration times the torque varies from zero to a maximum and back to zero while the velocity of the stator field is constant and the rotor position executes a simple harmonic motion. All other things being equal, if the torque were maximized during the acceleration (positive and negative) periods then the rotor could be moved to new positions in shorter periods of time.

Figure 3:
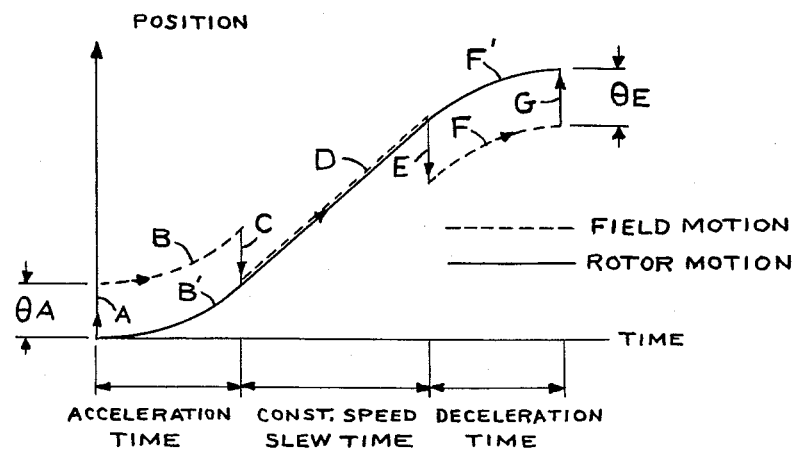
FIG. 3 shows a similar graph when utilizing the present invention.

In FIG. 3 there is shown the curves of stator field and rotor motion according to the invention again using the conventions of FIG. 2.

Before moving the rotor of the stepping motor to a new position, the stator field and rotor can be considered as aligned. When a commond is received for a new position the motor system goes through a set of operating steps. During operating step A the stator field which is a revolvable magnetic field is rapily angularly displaced from the rotor position by a first displacement angle $\theta_A$. For variable reluctance motors this angle is preferably about one and one quarter steps while for a permanent magnet motor it is preferably about 0.8 steps. Ideally, the displacement is instantaneous. However, because of the electrical inertia of the motor (winding inductance) the switching is not instantaneous. However, it is much faster than the movement of the rotor. There is now exerted a torque on the rotor. Preferably the torque is maintained at a constant maximum value to minimize the time required to get the rotor up to full velocity. This is done during operating step B by rotating the stator generated magnetic field at a linearly increasing angular velocity. Such a movement can be obtained by changing the angular position of the magnetic field as a parabolic function of time. Since the rotor motion is also parabolic, the distance between the stator field and the rotor is kept constant, in other words, constant torque is exerted on the rotor. After a period of time the rotor reaches a desired maximum rotational velocity. This period is a function of the motor driving current and the motor-load inertia.

When this instant is reached operating step C occurs. During this step the magnetic field is displaced "backward" to coincide with the rotor. The time for displacement is subject to the same considerations as in step A. After the displacement of step C the magnetic field is revolved at the same angular velocity as the rotor during operating step D.

After another period of time negative acceleration begins with operating step E. In this step the stator generated magnetic field is displaced "backward" by a displacement angle $\theta_E$, preferably equal to $\theta_A$, "behind the rotor". The time for a displacement is also subject to the considerations of step A. Thereafter, during step F the magnetic field is rotated at a uniformly increasing negative velocity for a time in the order of the positive acceleration time of step B. At the end of this time the rotor has zero velocity (stopped). Then the stator generated magnetic field is angularly displaced "forward" by the angle $\theta_E$ to coincide with the rotor.

In each positioning cycle the positive and negative accelerating times are fixed. The zero accelerating time is variable and a direct function of the distance between the old and new position.

There will now be described the apparatus of FIG. 4 for carrying out this process.

Figure 4:
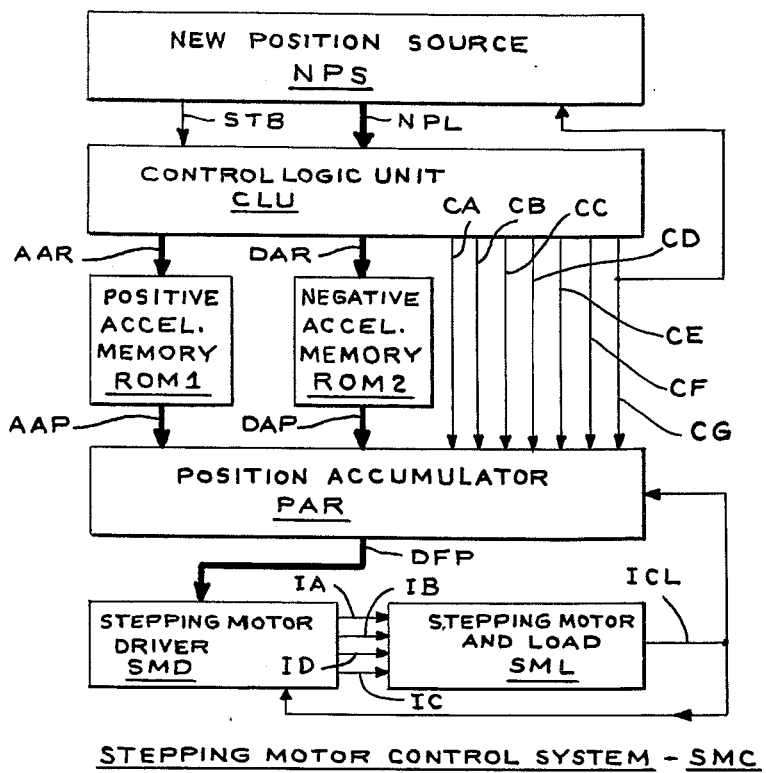
FIG. 4 is a block diagram of a stepping motor controller system in accordance with the invention.

The stepping motor control system MC shown in FIG. 4 is a digital control system for controlling the movement of the rotor of the stepping motor of FIG. 1 to various positions. The system comprises the new position source NPS which emits over the cable NPL the binary value of a desired rotor position. Along with emission of the binary number is a strobe pulse on the line STB. These signals are received by the control logic CLU which in response thereto primarily generates the signals on lines CA to CG which respectively represent the operation steps A to G as described with respect to FIG. 3. In addition, the control logic unit CLU generates two sets of addresses, one set on the cable AAR and the other set on the cable DAR. The addresses are respectively set to the positive acceleration memory ROM1 and the negative acceleration memory ROM2. Each of these memories can be a read-only memory wherein there are stored in a plurality for example 64 registers a set of binary values representing linearly increasing position increments. Within the memory ROM1 is a representation which will result in the field rotation shown for step B of FIG. 3 and within the memory ROM2 there is stored the 64 representations which will result in the field rotation for step F of FIG. 3. The outputs of the memories ROM1 and ROM2 are respectively binary value associated with particular positions of the associated parabolas. (It should be noted that for the system shown in FIG. 4 the memories store values which result in displacement values that are parabolic functions of time.) These positions are fed respectively via the cables AAP and DAP to the position accumulator PAR which also receives the control signals on lines CA to CG. The position accumulator PAR is primarily an adder-subtractor and a storage register. Within the storage register is stored the binary value representing the present position of the stator generated magnetic field. During the process this binary value is continuously changed and fed via the cable DFP to the stepping motor driver SMD. The stepping motor driver SMD converts the received binary number to a plurality of analog wave forms on the lines IA to ID which are used to energize the phase windings of the stepping motor connected to the load SML.

The operation of the system will now be described by making reference to both FIGS. 3 and 4. When a new position for the rotor of the stepping motor is desired the new position source NPS emits the value for the new position on the cable NPL along with the strobe pulse STP. Upon receipt of the strobe pulse the control logic unit CLU emits a pulse on the line CA establishing the step A of the process. Position accumulator PAR when it receives the signal on line CA immediately incrementes the value in the register of the position accumulator PAR by a position value equal to the displacement angle $\theta_A$. The new position of the stator generated magnetic field is fed via the cable DFP to the stepping motor drive CMD which in response thereto emits the appropriate current wave forms on the line IA to ID causing the magnetic field to be displaced ahead of the rotor. Then the control logic unit CUL terminates the signal on line CA and initiates the signal on line CB defining the step B of the process. At the same time the control logic unit CUL sequentially emits a set of addresses on the line AAR. These addresses are sequentially converted to position values which are fed via the cable AAP to the position accumulator PAR where they are sequentially added to the value in the position register which in response thereto keeps moving the position of the stator generated magnetic field. Since the values from the memory ROM1 are linearly increasing displacement increments, the stator generated field has a motion which is a parabolic function of time and traces out the dotted curve shown for step B as the rotor traces out the corresponding curve B'. In this way the stator field position leads the rotor position by the constant angle $\theta_A$. After a period of time when the rotor has reached the desired maximum velocity the control logic unit terminates the signal on line CB and initiates the signal on line CC representing step C of the process. Position accumulator PAR in response to this signal on line CC immediately decrements the position value stored in the position register by an amount representing the displacement angle $\theta_A$ bringing the stator field and the rotor into a coincident position.

The signal on line CC terminates and the signal on line CD begins representing the control step D of the process. During control step D in the presence of a signal on line CD the position accumulator PAR continuously and uniformly increments the value in the register thereof so that the position of the stator generated magnetic field increases at constant velocity in synchronism with the rotor. The linear increase in the displacement continuous until the control logic unit CLU emits a signal on line CE and terminates the signal on line CD. At that time the negative acceleration of the rotor begins. Specifically, the signal on line CE when received by the accumulator PAR causes it to subtract from the position value stored in its register a displacement equal to $\theta_A$ causing the stator field to lag the rotor position. Immediately thereafter the signal on line CE terminates and the signal on line CF begins. At the same time the control logic CLU emits addresses on cable DAR to the negative acceleration memory ROM2 which in response thereto emits binary numbers on cable DAP representing instantaneous values of a straight line with negative slope. This results in position accumulator PAR generating positions tracing out the curve of a parabola having the shape of the curve shown for step F of FIG. 3. During step F the rotor is negatively accelerated by virtue of an increasing negative velocity of the stator field. This continues until the rotor is stopped. At that time the control unit CLU emits a signal on line CG which when received by the position accumulator PAR adds the value representing the displacement angle $\theta_E$ to the position stored in the register thereof bringing the stator field in coincidence with the position of the rotor with no further incrementing of the stator field. Thus the rotor has stopped at the new desired position. The signal on line CG is also fed to the new position source NPS indicating that the positioning has been performed so that it can now initiate the movement to another desired position.

Although the system has been described for controlling movement in one direction it will be apparent that movement can be obtained in the opposite direction merely by changing the sign of every number fed to the adder-subtractor of the position accumulator. For example, instead of adding a value representing $\theta_A$ to the accumulator during step A this value is subtracted. The subtraction of step C in this case would be an addition. In this way bidirectional control can be obtained.

There will now be described the various elements of the stepping motor control system SMC shown in FIG. 4.

The new position source NPS can take many forms. It can be a processing unit which controls a stepping motor for the capstan of a tape drive, it can be a controller controlling the position of a moving body in a phototypesetter, a character generator or even a scanner. It can also be the microprocessor of a word processor or printer which moves print elements of the golf-ball type or of the daisy-wheel type. In any event it should have the property of emitting in binary form the desired position of the stepping motor's rotor.

The positive acceleration memory ROM 1 and the negative acceleration memory ROM2 are preferably read-only memories with their associated address registers.

The stepping motor and load SML are basically shown in FIG. 1 with the external load being, for instance, the capstan of a tape drive or the daisy-wheel of a printer. Affixed to the stepping motor or the load is a device which can emit a signal at a particular point in the rotational cycle to provide a feducial for the electronic part of the system.

Figure 5:
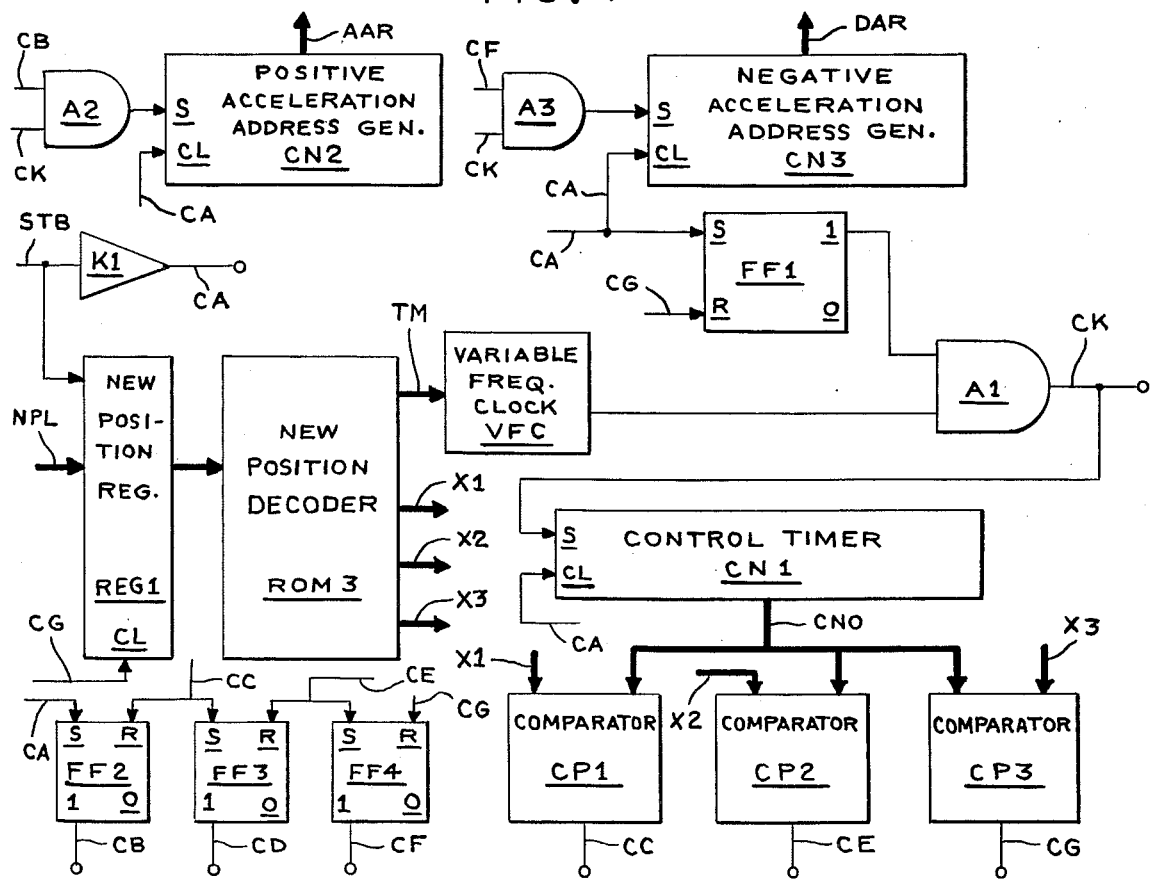
FIG. 5 is a logic diagram of the control logic unit of the system of FIG. 4.
Figure 6:
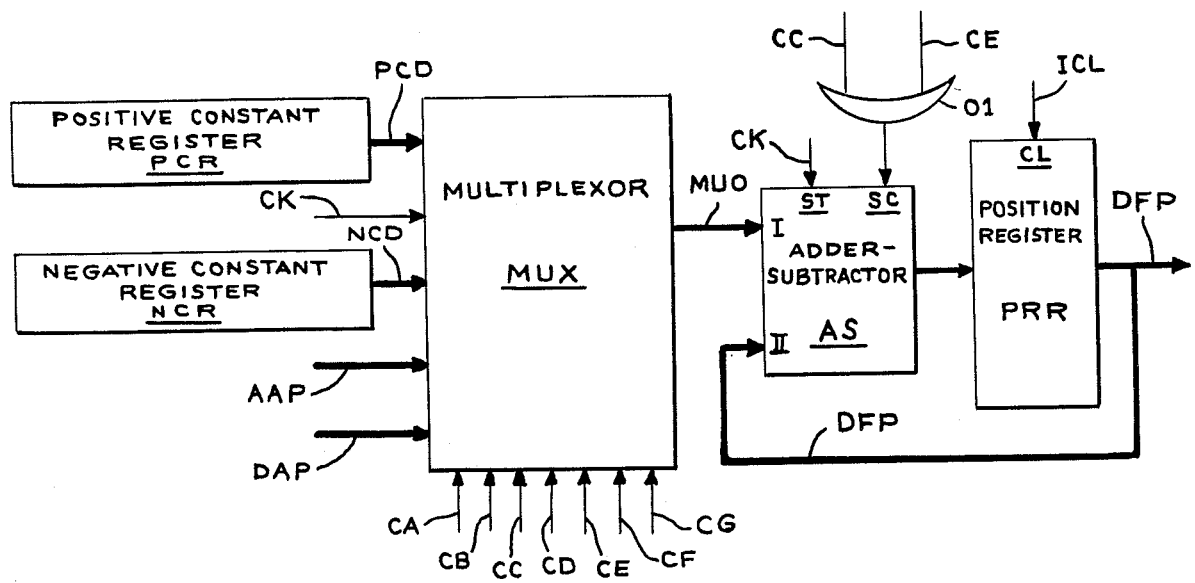
FIG. 6 is a logic diagram of the position accumulator of the system of FIG. 4.

The control logic CLU is shown in FIG. 5. The unit centers around the new position decoder ROM3 and the control timer CN1 which basically establish the control steps A to G. In addition, the unit includes the positive acceleration address generator CN2 and the negative acceleration address generator CN3 which are used to generate the addresses on cables AAR and DAR, respectively for addressing the acceleration memories ROM1 and ROM2.

In operation, when a new position is to be accessed the new position value is received on line NPL and fed to the new position register REG1. It enters this register by virtue of the strobe signal received on line STB. In addition, this strobe signal after amplification by amplifier K1 becomes the signal on line CA which initiates the control step A. Further, this signal clears the address generators CN2, CN3, the control timer CA and sets the flip-flop FF1 and its trailing edge sets the flip-flop FF2. The new position decoder ROM3 is basically a ROM (read only memory) which when it receives the value of the new position converts this value to at least three and preferably four values. The first value TM sets the frequency for a variable frequency clock VFC. The second value on cable X1 basically indicates the acceleration time for the new step. The value on cable X2 gives a measure of the slew time (step D) and the value on cable X3 gives the negative acceleration time (step F).

With the variable frequency clock VFC emitting pulses and with the flip-flop FF1 set, clock pulses are fed from AND-circuit A1 to the line CK. Since the termination of the signal on line CA set the flip-flop FF2 there is present a signal on line CB which, in addition to being fed to the position accumulator PAR as described above, is also fed to an input of the AND-circuit A2 whose second input receives the clock pulses on line CK. Thus, the positive acceleration address generator CN2 is unit incremented at the clock pulse rate and the addresses generated therefrom are fed via the cable AAR to the positive acceleration memory ROM1. At the same time, the clock pulses are fed to the incrementing input of the control timer CN1 which now starts generating on cable CN0 a continuously increasing count representing time. When the count on the cable CN0 equals the number of line X1 the end of the positive acceleration step is reached and the comparator CP1 indicates this fact by emitting a signal on line CC. This signal in addition to being fed to the position accumulator PAR as described above is also fed to the clear input of the flip-flop FF2 and the set input of the flip-flop FF3 terminating the signal on line CB. The trailing edge of the signal CC sets the flip-flop FF3 initiating the signal on line CD for control step CD associated with the slew time. At the end of the slew time, the number on cable CN0 will equal the value on cable X2 causing the comparator CP2 to emit a signal on line CE initiating step E. The signal on line CE in addition to being fed to the position accumulator PAR as described above, is also fed to the clear input of the flip-flop FF3 resetting this flip-flop. The trailing edge of the signal on line CE sets the flip-flop FF4 initiating the signal on line CF4 for the negative acceleration portion of the operation (step F).

This signal, in addition to being fed to the position accumulator PAR for controlling it, is also fed to one input of the AND-circuit A3 whose second input receives the clock pulses on line CK. Accordingly, the negative acceleration address generator CN3 is periodically incremented generating a sequence of addresses on cable DAR which are fed to the negative accumulation register ROM2 as described above.

Finally, when the count of the control time CN equals the value on the cable X3 the comparator CP3 emits a signal on line CG indicating the control step CG.

The position accumulator PAR is shown in FIG. 3 and centers around the adder-subtractor AS whose output is connected to the position register TRR. The adder-subtractor AS is a conventional, parallel adder-subtractor, having one operand input I connected to the cable MUO from the multiplexer MUX. The second operand input of the adder-subtractor AS is connected to the output of the position register PRR by the cable DFP. The adder-subtractor AS has a sign control input SC which is connected to the output of the OR-circuit 01 whose inputs are connected to the lines CC and CE. The adder-subtractor will operate as an adder at all times when a signal is not present at input SC and will operate as a subtractor only during those times when a signal is present at input SC.

The multiplexer MUX is effectively a multithrow, multiposition switch having as inputs cable PCD, line CK, cable NCD, cable AAP, and cable DAP. During step A when the signal CA is present, the mutiplexer MUX connects the positive constant register PCR via the cable PCD to the cable MUO. Stored in the positive constant register PCR is the binary value for the displacement angle $\theta_A$. This number is added to the number stored in the position register. During step B the signal on line CB causes the multiplex MUX to connect the cable AAP from the positive acceleration memory ROM1 to the cable MUO. Thus, the "parabolic" forming numbers emitted by the memory ROM1 are added each clock pulse time to the old value in the position register. During step C the signal on line CC converts the adder-subtractor to a subtractor, and also causes the multiplexer MUX to feed the value of $\theta_A$ stored in the positive constant register PCR to the cable MUO. During the step D the signal on line CD connects the line CK at the input of the multiplexer to the cable MUO so that during step D the position register is unit incremented at the clock pulse rate to provide constant velocity. During step E the signal on line CE first causes the adder-subtractor to operate as a subtractor and also connects the output of the negative constant register NCR via the cable NCD to the cable MUO so that the value of the displacement angle $\theta_E$ can be subtracted from the value stored in the position register. During step F the signal on line CF causes the multiplexer MUX to connect the cable DAP to the output MUO so that the position in the position register PRR is "parabolically" changed in accordance with the curve of step F. During step G as represented by the signal on line CG, the multiplexer MUX connects the negative constant register NCR to the cable MUO so that the displacement angle $\theta_E$ is subtracted from the value in the position register. It should be noted that the description has been concerned with say clock-wise rotation of the rotor. If counterclockwise rotation of the rotor is desired it is only necessary to invert the output of OR-circuit 01 and everything else remains the same.

Figure 7:
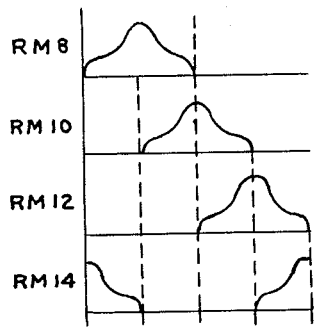
FIG. 7 is a logic diagram of the stepping motor driver of FIG. 4.
Figure 7:
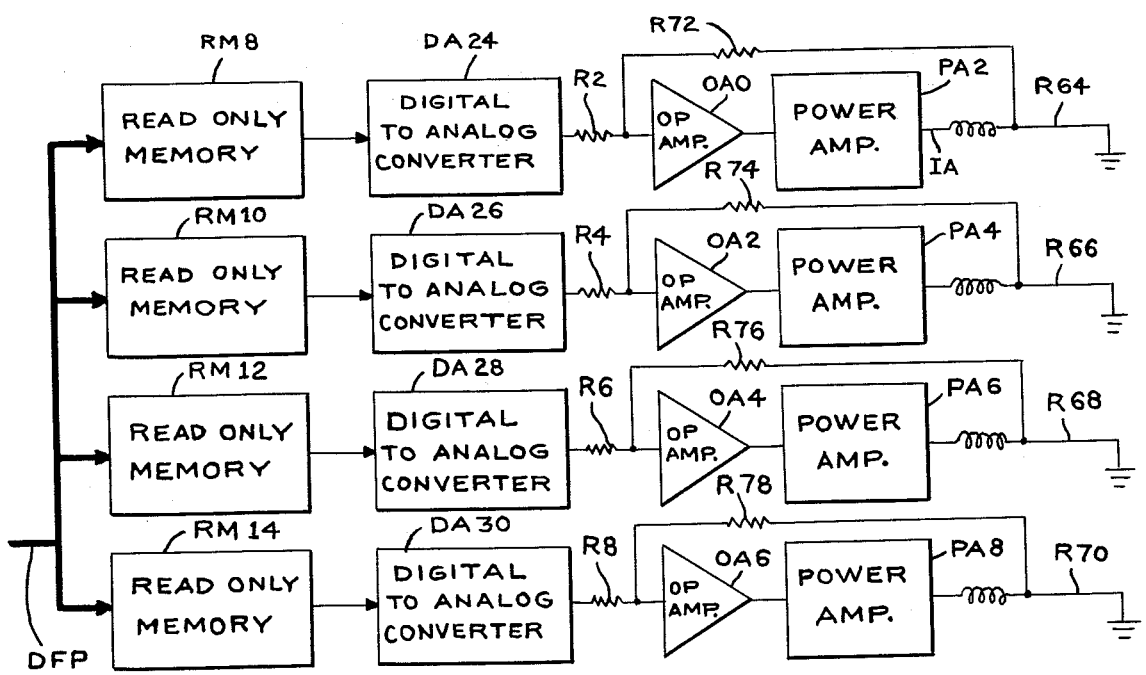

In the stepping motor driver SMD shown in FIG. 7 cable DFP feeds signals or addresses in parallel to read-only-memories RM8, RM10, RM12, and RM14. These in turn are connect via respective lines to digital-to-analog converters DA24, DA26, DA28 and DA30.

The digital-to-analog converters are connected via resistors R2, R4, R6 and R8 to op amps OA0, OA2, OA4 and OA6 in turn connected to power amplifiers PA2, PA4, PA6 and PA8. The power amplifiers PA2, PA4, PA6 and PA8 are respectively connected to windings IA, IB, IC and ID which represent the four phases of a stepping motor. The number of phases is selected for illustrative purposes only and is in no way limiting of the invention.

Resistors R64, R66, R68, and R70 are sensing resistors connected between the aforesaid windings and ground and they operate in conjunction with resistors R72, R74, R76, and R80 connected in feedback relationship to the aforementioned op amplifiers OA0, OA2, OA4, and OA6.

In the memories RM8, RM10, RM11 and RM14 are prerecorded the appropriate current profiles $I_A$, $I_B$, $I_C$, and $I_D$ (as functions of time), the ROM output data at any instant represent the instantaneous values of the winding currents. The current profiles are generated in the manner described in my above-references application. The current profiles of each memory are also shown in FIG. 7. In case of ROM 8, its output is converted into the analog voltage by the digital-to-analog converter DA24. The output loop, which consists of the operational amplifier OA0, the power amplifier PA2, resistors R64, R72 and R2, drives current through the phase A motor winding IA. Since the voltage of the function of resistors R64 and R72 is proportional to winding current, the distinct property of virtual ground of the op amp forces the motor current to be directly proportional to the digital-to-analog converter output.

There has thus been shown improved methods and apparatus for controlling the movement of a stepping motor. In fact the present methods and apparatus by virtue of applying constant torques with the stator field moving at increasing positive and negative accelerations permits more rapid movement of the stepping motor. In fact for a fixed acceleration time, the present methods permit a 25 percent faster movement of the rotor. In addition, if the upper limit of the velocity for the rotor is fixed then with the present methods the stepping will be accomplished in about one-eighth less time.

While only one embodiment of the invention has been shown and described in detail there will now be obvious to those skilled in the art many modifications and variations satisfying many or all of the objects of the invention but which do not depart from the spirit thereof as defined by the appended claims. For example, the memories ROM1 and ROM2 and their associated address counters can be replaced by respective counters which generate values $2c+1$ where c is the number of clock pulses received during the acceleration and deceleration times.

What is claimed is:

1. The method of driving a stepping motor from a first velocity to a second velocity, said stepping motor having a stator means for generating a revolvable magnetic field and a rotor whose angular position is influenced by the revolvable magnetic field, said method comprising first angularly displacing the revolvable magnetic field with respect to the rotor by a first displacement angle, in a given direction of revolution, continuously revolving the revolvable magnetic field until the rotor rotates at the second velocity, second angularly displacing the revolvable magnetic field with respect to the rotor by a second displacement angle in a direction of revolution opposite said given direction, and revolving the revolvable magnetic field at the second velocity.

2. The method of claim 1 wherein the first velocity is zero velocity.

3. The method of claim 1 wherein said second velocity is a zero velocity.

4. The method of claim 1 wherein said first and second displacement angles are equal.

5. The method of claim 4 wherein the displacement angle is constant during the revolution of the revolvable magnetic field between the two angular displacements of the revolvable magnetic field.

6. The method of claim 1 for further driving the stepping motor from the second velocity to the first velocity, by the steps of after revolving the revolvable magnetic field at the second velocity for a given period of time, third angularly displacing the revolvable magnetic field with respect to the rotor by a third displacement angle in said opposite direction of revolution, continuously revolving the revolvable magnetic field until the rotor rotates at the first velocity, fourth angularly displacing the revolvable magnetic field with respect to the rotor by a fourth displacement angle in said given direction of revolution and revolving the revolvable magnetic field at the first velocity.

7. The method of claim 6 wherein said first velocity is zero velocity.

8. The method of claim 7 wherein all of said displacement angles are equal and constant between the first and second displacements of the revolvable magnetic field and between the third and fourth displacement of the revolvable magnetic fields.

9. The method of claim 7 wherein the revolvable magnetic field revolves at a linearly increasing velocity between said first and second displacements whereby a constant positive accelerating torque is applied to the rotor and by a linearly decreasing velocity between said third and fourth displacements whereby a constant negative accelerating torque is applied to the rotor.

10. The method of claims 1 or 9 wherein said displacement angles are greater than one half and less than one step when the stepping motor is of the permanent magnetic type.

11. The method of claim 10 wherein said displacement angle is about 0.8 steps.

12. The method of claim 1 or 9 wherein said displacement angles are greater than one step and less than one and one-half steps when the stepping motor is of the variable reluctance type.

13. The method of claim 12 wherein said displacement angle is about one and one-quarter steps.

14. Apparatus for driving a rotatable load from a first velocity to a second velocity comprising: a stepping motor stator means, said stator means having a plurality of windings which are sequentially energizable for generating a revolvable magnetic field having particular angular positions in response to particular magnitudes of driving currents, a stepping motor rotor connected to said load, said stepping motor being within said stator and rotatable under the influence of the revolvable magnetic field current generating means for generating driving currents, the magnitudes of the driving currents being directly related to received representations of actual angular positions of the revolvable magnetic field, register means for storing a representation of the actual angular positions of the revolvable magnetic field, said register means having outputs connected to said current driving means, means for changing by a constant value the representation stored in said register means and after a given period of time inversely changing by said constant value the representation then stored in said register means, and means, operative during said given period of time for changing the representation stored in said register means by a linearly changing rate.

15. The apparatus of claim 14 further comprising means operative after said given period of time for changing the representation stored in said accumulator means by a constant rate.

16. The apparatus of claims 14 or 15 wherein said changing is an addition and said inverse changing is a subtraction.

17. The apparatus of claims 14 or 15 wherein said changing is a subtraction, said inverse changing is an addition and said constant rate is zero.

* * * * *